United States Patent [19]

Bakken et al.

[11] 4,090,964
[45] May 23, 1978

[54] ACID DISPENSER FOR WATER SOFTENER UNIT

[75] Inventors: Daniel Allen Bakken, White Bear Lake; Robert Allen Henderson, Rosemount; Edward Joseph Tischler, St. Paul, all of Minn.

[73] Assignee: Ecodyne Corporation, Lincolnshire, Ill.

[21] Appl. No.: 817,633

[22] Filed: Jul. 21, 1977

[51] Int. Cl.² ............................................. B01D 41/00
[52] U.S. Cl. ..................................... 210/134; 210/191; 222/334
[58] Field of Search ............... 210/134, 139, 190, 191; 222/207, 380, 334, 214

[56] References Cited

U.S. PATENT DOCUMENTS

| 2,576,282 | 11/1951 | Chambers | 222/214 |
|---|---|---|---|
| 3,162,324 | 12/1964 | Houser | 222/334 |
| 3,242,952 | 3/1966 | Austin | 222/334 |
| 3,830,405 | 8/1974 | Jaeger | 222/334 |
| 3,882,882 | 5/1975 | Preisig | 222/334 |

Primary Examiner—John Adee
Assistant Examiner—E. Rollins Cross
Attorney, Agent, or Firm—Joel E. Siegel; Charles M. Kaplan

[57] ABSTRACT

A dispenser for metering a predetermined volume of acid into a water softener brine tank utilizes a generally hat-shaped diaphragm that flops from one surface of a metering chamber to the opposite surface when acted upon by either pressure or suction. The diaphragm essentially lines one-half of the chamber at a time, and its movement either draws acid into the chamber or expels the acid from the chamber.

7 Claims, 5 Drawing Figures

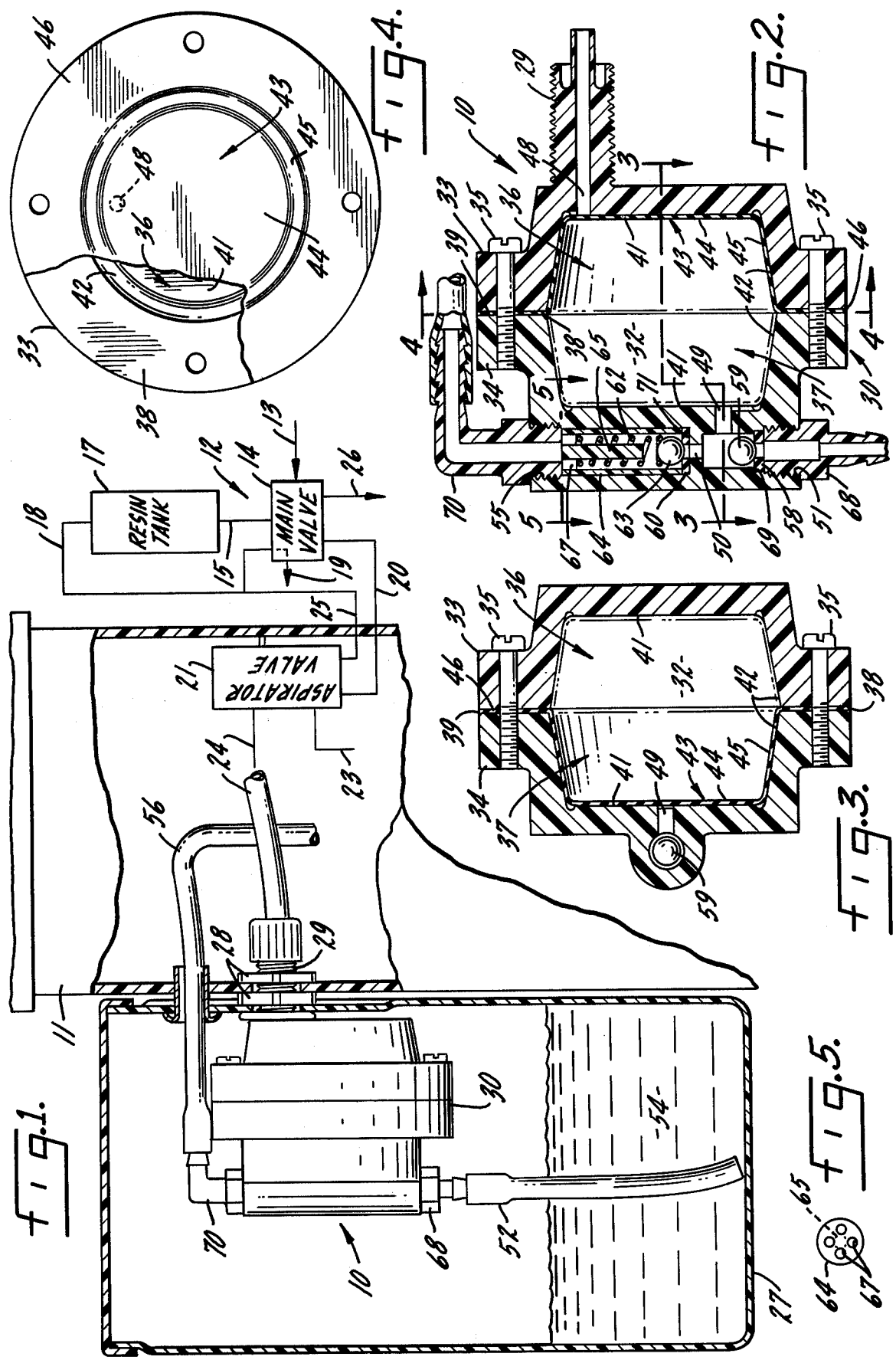

ACID DISPENSER FOR WATER SOFTENER UNIT

BACKGROUND OF THE INVENTION

Water softener units utilizing ion exchange resin particles must be regenerated periodically with a brine solution to restore the water hardness removing ability of such particles. When iron is present in the water being treated it is advantageous to include weak acids, such as citric acid, in the regeneration solution. A supply of such acid is stored in a separate container and a metered dose is dispensed into the brine tank during each regeneration cycle of the water softener. A variety of types of acid dispensers have been used in the past, and each had disadvantages. For example, the amount of acid dispensed might vary over a long period of time as the parts of the dispenser became worn or lost their elasticity, or all of the acid in the storage container might be dispensed in a single cycle if the dispenser failed to shut off properly.

OBJECTS OF THE INVENTION

Accordingly, it is an object of the invention to provide a water softening system with an improved acid dispenser.

Another object is to provide an acid dispenser in which a positive force expels all of the acid from the metering chamber.

Another object is to provide a dispenser having an improved diaphragm that responds to pressure and suction to meter a predetermined dose of acid into a brine reservoir.

Another object is to provide a regeneration acid dispenser with a diaphragm that is enclosed in and protected by a metering chamber.

Another object is to provide a water softener with a regeneration fluid dispenser that will discharge only one metered dose of acid if the system malfunctions.

Another object is to provide an acid dispenser for conditioning water that is durable, relatively inexpensive and easily maintained, and which does not possess defects found in similar prior art devices.

Other objects and advantages of the invention will be found in the specification and claims, and the scope of the invention will be set forth in the claims.

DESCRIPTION OF THE DRAWING

FIG. 1 is a partially broken away, partially schematic representation of a water softener system in accord with this invention.

FIG. 2 is a cross-sectional view of the acid dispenser shown in FIG. 1.

FIG. 3 is a cross-sectional view taken along the line 3—3 in FIG. 2.

FIG. 4 is a cross-sectional view taken along the line 4—4 in FIG. 2.

FIG. 5 is a cross-sectional view taken along the line 5—5 in FIG. 2.

DESCRIPTION OF A PREFERRED EMBODIMENT

The drawing shows a dispenser unit 10 for metering a dose of an acid, such as citric acid, to a brine tank 11 of a conventional ion exchange water softener system 12. Hard water from a line 13 is fed to a conventional main control valve 14 and passes through a line 15 into a bed of ion exchange resin particles in a resin tank 17 during the service cycle. The softened water flows through a line 18 back to valve 14 which directs it to service through a line 19.

After softening a predetermined amount of hard water, the resin in tank 17 loses most of its ion exchange capacity and must be regenerated. This is accomplished in conventional manner by passing a brine and acid solution through the resin particles in tank 17. The regeneration cycle begins when valve 14 directs a portion of the incoming hard water from line 13 through a line 20 to a conventional aspirator valve 21. This creates a partial vacuum or suction in lines 23 and 24. Line 23 communicates with the inside of brine tank 11, in which valve 21 may be mounted. The suction in line 23 draws the regenerant solution, which comprises brine and acid in tank 11, into valve 21, from which such solution passes through a regenerant supply line 25 into line 18, and then through the resin particles in tank 17. After regnerating the ion exchange particles in tank 17, the acid and brine regenerant solution passes through line 15 into valve 14, which directs the spent regenerant to drain through line 26. During the regeneration cycle, the resin also may be backwashed and fast rinsed.

When sufficient regenerant has passed through tank 17 to restore the water softening capacity of the resin, the regeneration cycle is terminated by valve 14 and the service cycle is started again. During the regeneration cycle, some of the hard water from line 13 may pass through valve 14 to line 19 to maintain a continuity of service. During the service cycle some of the soft water passes through line 25 and valve 21 to line 23 to supply makeup water to brine tank 11 in the conventional manner. The water from line 25 also enters line 24 where it provides approximately the full pressure from line 13 for operation of dispenser 10, as explained hereafter.

Acid dispenser 10 is located inside of an acid storage reservoir or container 27 that is hung on the side of brine tank 11. Nuts 28 threaded on a nipple 29, which passes through holes in container 27 and tank 11, secure container 27 and dispenser 10 in place. Dispenser 10 includes a hollow plastic housing 30 that defines therein an acid metering chamber 32. Housing 30 is made from first and second members 33 and 34, respectively, which are separably connected by self-tapping screws 35 which pass through holes in first member 33 and are turned into smooth holes in second member 34. Members 33 and 34 have identical truncated conical cavities 36 and 37 therein. Each member has a flat annular surface 38 or 39 surrounding its cavity. Each cavity 36 or 37 has a flat circular end wall 41, and a side wall 42 which slants away from its end wall 41 until it joined the annular surface 38 or 39. Thus each cavity becomes smaller in vertical cross section, or tapers, from its annular surface to its end wall 41.

A unitary, flexible, generally hat-shaped diaphragm 43 made from fabric-reinforced rubber is shaped like the truncated conical surface of either of cavities 36 or 37. Diaphragm 43 has a flat circular end portion 44 shaped like an end wall 41 and a side portion 45 which slants toward an annular rim 46 that extends around the diaphragm. Rim 46 is compressed between abutting surfaces 38 and 39 and thus seals the joint between members 33 and 34 while holding disphragm 43 in place.

A first hole 48 through first member 33 connects cavity 36 to line 24, which is the source of pressure and suction for dispenser 10. A second hole 49 through second member 34 connects cavity 37 to a vertical acid flow channel 50. The bottom tapped end 51 of channel 50 is connected to an acid intake hose or line 52 that extends into the pool of acid 54 in container 27. The top tapped end 55 of channel 50 is connected to an acid dispensing hose or line 56 that extends into brine tank 11. A first horizontal check valve seat 58 in channel 50 made from resilient rubber is located below second hole 49, and a loose spherical ball check valve 59 rests on seat 58. A second horizontal check valve seat 60 in channel 50 made from resilient rubber is located above second hole 49, and a coil spring 62 holds a spherical ball check valve 63 on seat 60. Spring 62 and ball 63 are housed in an open-ended cylinder 64 that may be removed from channel 50. Spring 62 is coiled around a rod 65 that is integral with cylinder 64. Holes 67 in the closed end of cylinder 64 permit acid to flow through channel 50. A first hose nipple 68 connected to line 52 is threaded into the tapped hole at the bottom end 51 of channel 50. The end of nipple 68 bears against first valve seat 58 thus securely holding seat 58 against a shoulder 69 in channel 50. A second hose nipple 70 connected to line 56 is threaded into the tapped hole at the top end 55 of channel 50. The end of nipple 70 bears against the upper end of cylinder 64; this forces the lower open end of cylinder 64 against second valve seat 60, thus securely holding seat 60 against an annular shoulder 71 in channel 50. The end of rod 65 acts as a stop preventing ball 63 from obstructing hose nipple 70 above seat 60.

As shown in FIG. 2, diaphragm 43 lies against and lines the surface of cavity 36 and metering chamber 32 should be full of acid. During the backwash or fast rinse cycle, water under full line pressure passes through line 24 and first hole 48 into chamber 32. This pushes diaphragm 43 into cavity 37 and expels the acid from chamber 32 through second hole 49 past check valve 63 up channel 50 and out through nipple 70; the metered dose of acid flows into brine tank 11 through line 56. As the last of the acid leaves chamber 32, diaphragm 43 flops over to the position shown in dotted lines in FIG. 2 and in solid lines in FIG. 3 where it lies against and lines the surface of cavity 37, and chamber 32 is full of water. During the brining cycle, the vacuum in line 24 sucks the water from chamber 32 through first hole 48 and draws diaphragm 43 back into cavity 36. This creates a suction in second hole 49 that draws acid up through line 52 past check valve 59 into chamber 32. As the last of the water leaves chamber 32, diaphragm 43 flops back over to the position shown in full lines in FIG. 2 and dotted lines in FIG. 3 and chamber 32 is once again full of acid. The force of spring 62 prevents air from being drawn under valve 63 when suction is applied to line 24, and this spring also prevents acid from being expelled from chamber 32 if pressure less than substantially full line pressure is applied to line 24, as for example during the backwash or fast rinse cycles of the water softening system. Thus a predetermined quantity of acid is metered into brine tank 11 during each service cycle. Over a period of time, the concentration of acid in the brine reaches equilibrium. This ensures that the regenerant solution drawn into the resin bed in tank 17 during each regeneration cycle will have the proper strength to remove iron or other unwanted minerals.

It has thus been shown that by the practice of this invention a generally hat-shaped diaphragm 43 moves to positions in which acid metering chamber 32 is either full or empty. Diaphragm 43 is moved to its position lining cavity 36 only during the brief period when suction is exerted at first hole 48, and diaphragm 43 lines cavity 37 so as to seal off chamber 32 when essentially full line pressure is exerted at hole 48. Thus it is not possible for dispenser 10 to malfunction in a manner that will draw all of the acid out of container 27 and expel all such acid into brine tank 11. In addition, all parts are easily accessible for cleaning, replacement or repair when necessary.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. A water softening system wherein water being treated flows through a bed of ion exchange particles in a tank during a service cycle and such particles are regenerated by flowing an acid solution and a brine solution through such tank during a regeneration cycle, the acid solution being supplied to such tank from an unpressurized acid storage reservoir of an acid dispensing unit through a regenerant supply line from a brine reservoir, said acid dispensing unit comprising a hollow housing having an acid metering chamber therein, said housing comprising a first member and a second member each having an identical conical cavity therein and an annular surface surrounding its cavity, a flexible diaphragm in said chamber shaped substantially identically like the surface of one of said cavities, and lying in contact with and lining one or the other of said cavities, an annular rim extending from said diaphragm, said rim being compressed between said annular surfaces which are held in abutment by means securing said members together, a first hole through said first member connecting its cavity to a source of pressure and suction, a second hole through said second member connecting its cavity to an acid flow channel, one end of said channel being connected to an intake line from said acid storage reservoir and the other end of said channel being connected to an acid dispensing line leading to a reservoir for said brine solution, a first check valve seat in said channel on one side of said second hole and a loose spherical ball check valve on said first seat, a second check valve seat in said channel on the other side of said second hole and a spring holding a spherical ball check valve against said second seat, said metering chamber being empty when said diaphragm lines the cavity in said second member, suction applied to said first hole causing said diaphragm to flop to a mirror image position lining said first cavity, movement of said diaphragm from said second cavity to said first cavity creating suction in said chamber which draws sufficient acid through said one end of said channel past said first check valve to fill said chamber, and pressure applied to said first hole causing said diaphragm to flop to a position lining said second cavity, thereby expelling all of the acid in said chamber through said second hole and past said second check valve into said brine reservoir from which such metered quantity of acid passes with said brine solution through said regenerant supply line to said bed during said regeneration cycle.

2. The invention defined in claim 1, wherein the force of said spring holding said check valve against said second seat is sufficient to prevent lifting of such check valve when a relatively small back pressure is exerted on said diaphragm through said first hole.

3. The invention defined in claim 1, wherein said conical cavities each taper away from the center of said metering chamber.

4. The invention defined in claim 1, further comprising said acid flow channel having a tapped hole at each end, a first hose nipple connected to said intake line and a second hose nipple connected to said dispensing line respectively being threaded into such tapped holes, and the ends of said nipples securely holding said first and second valve seats in place.

5. The invention defined in claim 1, further comprising a removable cylinder in said acid flow channel enclosing said spring and ball check valve, and a rod integral with said cylinder being surrounded by said spring and limiting movement of said ball check valve.

6. The invention defined in claim 1, further comprising each cavity having a circular end wall and a side wall which slants away from said end wall until it joins said annular surface, and said diaphragm being generally hat-shaped and having a circular end portion shaped like a cavity end wall and a slanted side portion shaped like a cavity side wall.

7. A water softening system wherein water being treated flows through a bed of ion exchange particles in a tank during a service cycle and such particles are regenerated by flowing an acid solution and a brine solution through such tank during a regeneration cycle, the acid solution being supplied to such tank from an unpressurized acid storage reservoir of an acid dispensing unit through a regenerant supply line from a brine reservoir, said acid dispensing unit comprising a hollow housing having an acid metering chamber therein, said housing comprising a first and a second member each having an identical truncated conical cavity therein and a flat annular surface surrounding its cavity, said cavities each tapering away from the center of said chamber and having a flat circular end wall, a flexible unitary disphragm in said chamber shaped substantially identically like the surface of one of said cavities and lying in contact with and lining one or the other of said cavities, said diaphragm being generally hat-shaped and having a flat circular end portion shaped like a cavity end wall and a side portion which slants toward an annular rim that extends around said diaphragm, said rim being compressed between said flat annular surfaces which are held in abutment by removable fasteners separably securing said members together and sealing the joint between the surfaces defining said metering chamber, a first hole through said first member connecting its cavity to a source of pressure and suction, a second hole through said second member connecting its cavity to a vertical acid flow channel, the bottom end of said channel being connected to an intake line from said acid storage reservoir and the top end of said channel being connected to an acid dispensing line leading to a reservoir for said brine solution, a first horizontal check valve seat in said channel below said second hole and a loose spherical ball check valve resting on said first seat, a second horizontal check valve seat in said channel above said second hole and a spring holding a spherical ball check valve against said second seat, said vertical acid flow channel having a tapped hole at each end, a first hose nipple connected to said intake line and a second hose nipple connected to said dispensing line respectively being threaded into such tapped holes, the ends of said nipples securely holding said first and second valve seats in place, a removable cylinder in said vertical acid flow channel enclosing said spring and ball check valve, a rod integral with said cylinder being surrounded by said spring and limiting upward movement of said ball check valve, said metering chamber being empty when said diaphragm lines the cavity in said second member, suction applied to said first hole causing said diaphragm to flop to a mirror image position lining said first cavity, movement of said diaphragm from said second cavity to said first cavity creating suction in said chamber which draws sufficient acid through the bottom of said channel past said first check valve to fill said chamber, and pressure applied to said first hole causing said diaphragm to flop to a position lining said second cavity, thereby expelling all of the acid in said chamber through said second hole and past said second check valve into said brine reservoir from which such metered quantity of acid passes with said brine solution through said regenerant supply line to said bed during said regeneration cycle.

* * * * *